United States Patent [19]

Thibodeau et al.

[11] 4,321,514
[45] Mar. 23, 1982

[54] COMMUTATED SCR REGULATOR FOR A HORIZONTAL DEFLECTION CIRCUIT

[75] Inventors: Leslie N. Thibodeau; David W. Luz, both of Indianapolis; James E. Hicks, New Palestine, all of Ind.

[73] Assignee: RCA Corporation, New York, N.Y.

[21] Appl. No.: 204,978

[22] Filed: Nov. 7, 1980

[51] Int. Cl.³ .............................................. H01J 29/70
[52] U.S. Cl. .................................... 315/411; 358/190
[58] Field of Search ................ 315/408, 411; 358/190

[56] References Cited

U.S. PATENT DOCUMENTS

| | | |
|---|---|---|
| 3,824,427 | 7/1974 | McLeod, Jr. |
| 3,970,780 | 7/1976 | Minoura . |
| 4,028,589 | 6/1977 | Verbeij .................. 315/408 |
| 4,034,263 | 7/1977 | Dietz ..................... 315/408 |
| 4,145,639 | 3/1979 | Willis ..................... 315/411 |
| 4,146,823 | 3/1979 | Dietz ..................... 315/408 |
| 4,190,791 | 2/1980 | Hicks ..................... 315/408 |
| 4,193,018 | 3/1980 | Dietz ..................... 315/408 |
| 4,214,189 | 7/1980 | Bohringer ............... 315/408 |
| 4,227,125 | 10/1980 | Bohringer ............... 315/411 |

FOREIGN PATENT DOCUMENTS 48-43214 6/1973 Japan .

OTHER PUBLICATIONS

W. Dietz, AN-4735, A Thyristor Horizontal Deflection High Voltage and Power Supply System for RCA 110° Color Picture Tubes, Dec. 71.
W. Dietz, IEEE Transactions on Broadcast and TV Receivers, 1973, pp. 37-40, A Thyristor Regulator Circuit for SCR Deflection.

Primary Examiner—Theodore M. Blum
Attorney, Agent, or Firm—Paul J. Rasmussen; William H. Meagher; Joseph Laks

[57] ABSTRACT

A retrace pulse voltage is applied to a first flyback transformer winding of a horizontal deflection circuit to develop retrace pulse voltages across other flyback transformer windings. Second and third windings of the flyback transformer are coupled in a series arrangement with a controllable switch across a source of input voltage. A regulator control circuit turns on the SCR at a controllable instant within the trace interval of each deflection cycle to generate input current in the series arrangement. When the retrace pulse voltage is applied to the flyback transformer first winding, the input current begins to decrease in magnitude, commutating off the SCR within the retrace interval. The leakage inductance associated with the series arrangement of flyback transformer second and third windings and the total reflected retrace pulse voltage developed by the two windings determine the instant within retrace that the SCR is commutated off. The third winding is loosely coupled with the first winding, whereas the second winding is tightly coupled with the first winding. By varying the second to third winding turns ratio, the amount of leakage inductance in the series arrangement may be varied without significantly altering the magnitude of the total reflected retrace pulse voltage.

7 Claims, 3 Drawing Figures

COMMUTATED SCR REGULATOR FOR A HORIZONTAL DEFLECTION CIRCUIT

This invention relates to regulated deflection circuits.

Switching regulators, when operated at the relatively high frequency of the horizontal deflection frequency, provide relatively compact and low dissipation regulated power supplies for television receivers. One type of switching regulator employs an SCR operated at the horizontal deflection frequency as the controllable regulator switch. The SCR is placed between the unregulated input voltage terminal and the B+ supply voltage terminal.

A regulator control circuit turns on the SCR at a controllable instant within the trace interval of each horizontal deflection cycle to generate input current flowing from the unregulated voltage terminal to the regulated B+ voltage terminal. To limit the input current, an inductance is coupled in series with the SCR. A flyback transformer secondary winding is also coupled in series with the SCR. The reflected retrace pulse voltage developed by the secondary winding produces a decrease in the input current to commutate off the SCR within the retrace interval of each deflection cycle.

The commutation interval of the SCR is the time that it takes the input current to decrease to zero when the reflected retrace pulse voltage is applied to the series inductance. The duration of the commutation interval is determined by the magnitude of the series inductance and the magnitude of the applied reflected retrace pulse voltage. The commutation interval shortens with increased applied retrace pulse voltage and lengthens with larger series inductance.

The values of the series inductance and reflected retrace pulse voltage are selected to ensure that the regulator SCR is commutated off before the end of the retrace interval under all normal deflection circuit operating conditions of input voltage and loading variations. If the SCR is not switched into the off-state before the end of retrace, loss of regulation thereafter ensues.

Instead of using a separate discrete inductor to develop the series inductance, the regulator secondary winding may be loosely coupled magnetically with the flyback transformer primary winding. The leakage inductance between the two windings then comprises the required series inductance. The net voltage applied to the leakage inductance during retrace equals the reflected retrace pulse voltage amplitude less the difference between the unregulated input voltage and the regulated B+ voltage. The net applied voltage and the magnitude of the leakage inductance determine the commutation time of the SCR within retrace, at a given peak input current value.

Generally, the magnitude of the series inductance is selected small enough so as to ensure commutation of the SCR within retrace even for high input voltage conditions which produce increased peak input current values. When using the leakage inductance as the series inductance, designing a relatively small leakage inductance into the flyback transformer may be accomplished by keeping small the number of secondary winding turns relative to primary winding turns. However, since the number of secondary winding turns also determines the magnitude of the reflected retrace pulse voltage that produces the decrease in the input current, decreasing the number of secondary winding turns may not produce any significant shortening of the SCR commutation time since the reflected retrace pulse voltage amplitude is also reduced.

A feature of the invention is to provide a flyback transformer regulator winding arrangement which permits greater flexibility in selecting the proper amount of leakage inductance needed to ensure commutation of the SCR under high input voltage conditions without adversely affecting the magnitude of the retrace pulse voltage reflected by the regulator winding arrangement. The retrace pulse voltage developed by a deflection generator across a horizontal deflection winding is applied to a first winding of a flyback transformer. Second and third regulator windings of the flyback transformer are coupled in a series arrangement with a controllable switch across a source of input voltage. Input current from the source flows in the series arrangement when the controllable switch is turned on at a controllable instant within the trace interval of each deflection cycle. The deflection winding retrace pulse voltage, when applied to the flyback transformer first winding, produces a decreasing magnitude input current to commutate off the controllable switch within the retrace interval of each deflection cycle. The magnetic coupling of the third winding with the first winding is designed to be less than the magnetic coupling of the second winding with the first winding. By using a series arrangement of second and third flyback transformer windings of different magnetic coupling, the required inductance in series with the controllable switch is obtained from the loose coupling of the third and first windings.

The reflected retrace pulse voltage amplitude is to a great extent determined by the total number of second and third winding turns. Changing the number of turns of the third winding relative to the number of turns of the second windings, while maintaining the total number of second and third winding turns substantially the same, will produce a substantial change in the amount of leakage inductance in series with the controllable switch without producing a substantial change in the amplitude of the total reflected retrace pulse voltage. Substantial flexibility is thereby provided in selecting the proper amount of leakage inductance to ensure proper commutation of the regulator SCR under high input voltage conditions without altering significantly the total reflected retrace pulse voltage amplitude.

In a specific embodiment of the invention, the flyback transformer includes a generally rectangular core. The first and second windings are located on one leg of the core and the third winding is located on the opposite leg. The first and second windings are relatively tightly coupled to each other, whereas the first and third windings are relatively loosely coupled to each other. The leakage inductance is therefore substantially determined by the degree of coupling between the first and third windings. Removing turns from the third winding and adding them to the second winding substantially reduces the leakage inductance present. The total reflected retrace pulse voltage is little changed since the total number of turns developing the reflected retrace pulse voltage remains unchanged.

Figure 1:
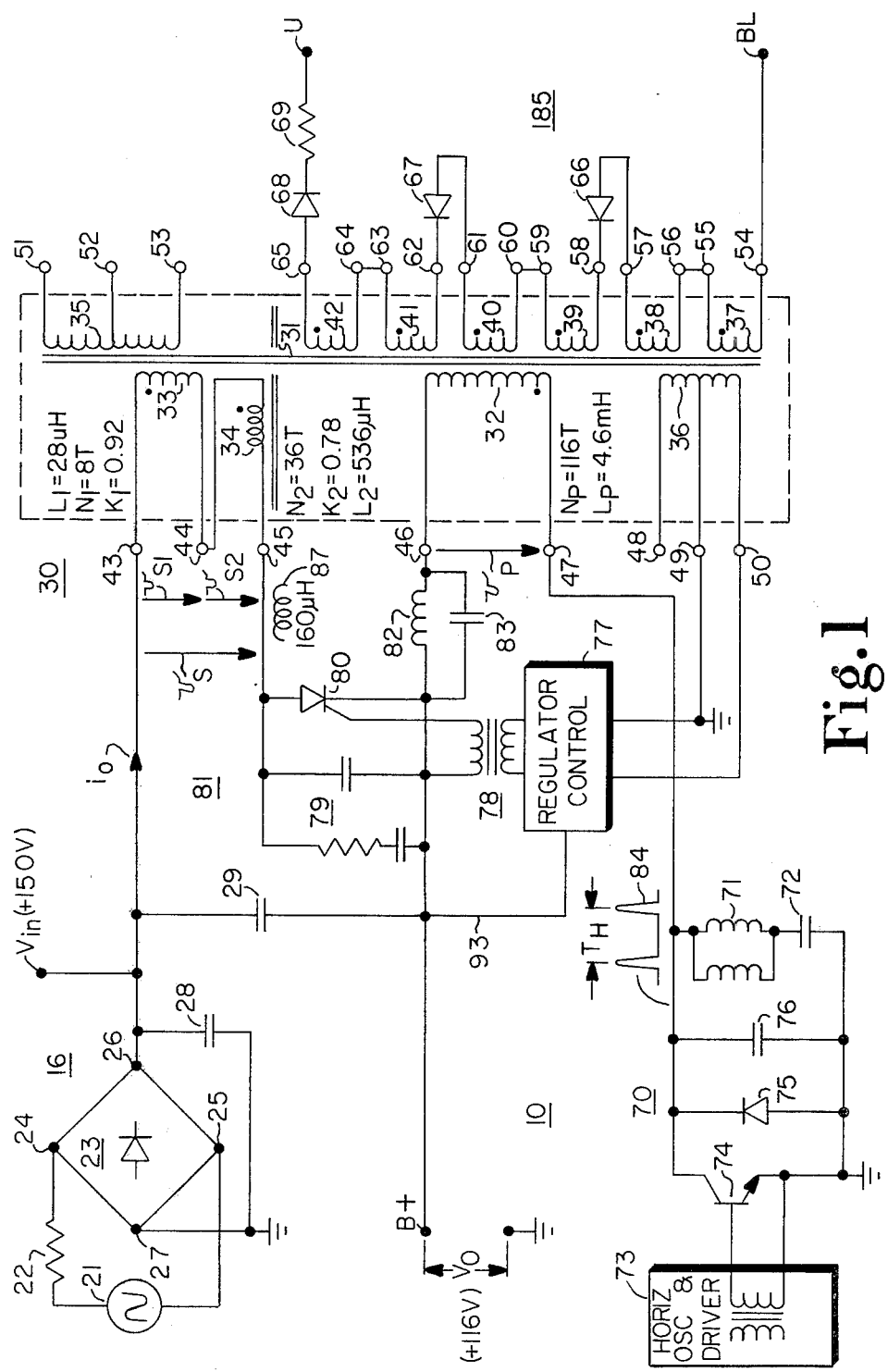
FIG. 1 illustrates a regulated deflection circuit embodying the invention.

In the television receiver horizontal deflection circuit 10 of FIG. 1, a horizontal output or flyback transformer 30 comprises a plurality of winding units 32-42, each wound around a portion of a magnetizable core 31. Lead wires, including tap lead wires, are brought out from the winding units and electrically connected to associated terminal stakes 43-65.

Winding unit 32 comprises the flyback transformer primary winding with stake terminal 46 conductively coupled to a B+ supply terminal through a high voltage tuning network comprising an inductor 82 in parallel with a capacitor 83. A regulated direct current B+ scanning voltage, $V_0$, is developed at the B+ terminal. Stake terminal 47 is coupled to a horizontal deflection winding 71 of a horizontal deflection generator 70. Horizontal deflection generator 70 comprises a horizontal oscillator and driver 73, a horizontal output transistor 74, a damper diode 75, a retrace capacitor 76 and the series arrangement of horizontal deflection winding 71 and an S-shaping capacitor 72.

Figure 3:
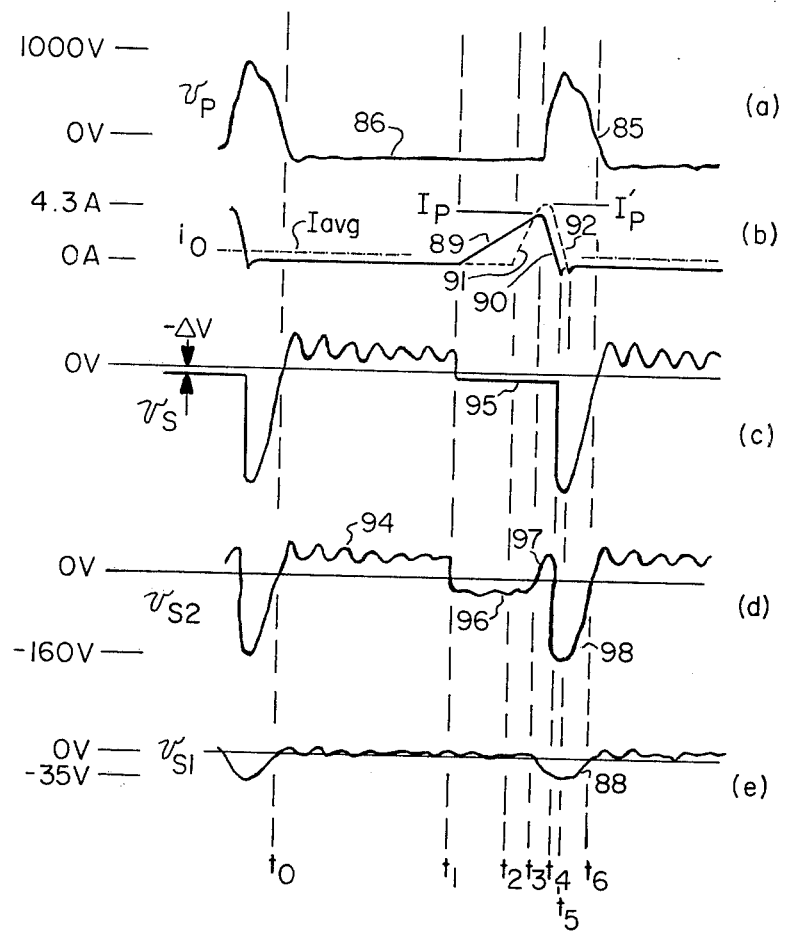
FIGS. 3a-3e illustrate waveforms associated with the operation of the circuit of FIG. 1.

By means of the switching action of horizontal output transistor 74, a horizontal rate, $1/T_H$, retrace pulse voltage is developed across horizontal deflection winding 71, as illustrated in FIG. 1 by the retrace pulse voltage 84 developed at the collector of horizontal output transistor 74. The horizontal deflection winding retrace pulse voltage is applied to flyback transformer primary winding 32. As illustrated in FIG. 3a, the voltage $v_p$ across primary winding 32 equals a positive pulse voltage 85 during the horizontal retrace interval, Tr, between times $t_3-t_6$ and equals the negative voltage 86 during the trace interval between times $t_0-t_3$.

The retrace pulse voltage applied across primary winding 32 develops pulse voltages across the other flyback transformer windings. The voltage across winding 35, for example, may be rectified and filtered by circuitry not shown to develop DC supply voltages for such circuits as the vertical deflection and audio circuits. The pulse voltage developed in winding 36, for example, may be utilized as a timing signal for such circuits as the picture tube blanking circuit.

A high voltage supply circuit 185, comprising flyback windings 37-42, rectifiers 66-68, and a resistor 69 develops a DC ultor voltage for the television receiver picture tube at a terminal U. Stake terminal 54 is connected to a terminal BL, the input of a conventional beam limiter circuit. Pairs of winding units, 37 and 38, 39 and 40, 41 and 42, are coupled together by jumper wires connected across respective pairs of stake terminals 55 and 56, 59 and 60, 63 and 64. Rectifier 66 is coupled between stake terminals 57 and 58, rectifier 67 is coupled between stake terminals 61 and 62, and rectifier 68 is coupled between stake terminal 65 and resistor 69. Rectifiers 66-68 rectify the voltages developed across windings 37-42, during the horizontal retrace interval, to develop the ultor voltage at terminal U that is filtered by the picture tube ultor capacitance not illustrated.

A DC voltage source 16 comprises a source of alternating polarity mains voltage 21 coupled across input terminals 24 and 25 of a full-wave bridge rectifier 23 and a filter capacitor 28 coupled between terminal 26 and a current return or ground terminal 27. A current limiting resistor 22 is coupled between mains supply source 21 and terminal 24. An unregulated DC input voltage $V_{in}$ is developed at terminal 26.

A switching regulator 81, operated at the horizontal deflection frequency, develops the regulated B+ scanning voltage $V_0$ at the B+ terminal from the unregulated DC input voltage $V_{in}$ developed at terminal 26. A filter capacitor 29 is coupled between the two terminals to filter out horizontal rate ripple voltage. Switching regulator 81 comprises the series arrangement of flyback transformer secondary windings 33 and 34 and a controllable switch, SCR 80, coupled across DC voltage source 16 by way of the B+ supply terminal. SCR 80 is switched at a horizontal rate by gating pulses developed by a regulator control circuit 77 and applied to the gate of the SCR through a coupling transformer 78. Synchronization with horizontal scanning is obtained by coupling to regulator control circuit 77 the retrace pulse voltage developed across stake terminals 49 and 50.

Flyback transformer regulator winding 33 is designed to be tightly coupled magnetically with the primary winding 32, with a coefficient of coupling $k_1=0.92$. The voltage $v_{s1}$ developed across regulator winding 33 is therefore generally of the same waveshape as the primary winding voltage $v_p$, as illustrated by the voltage $v_{s1}$ of FIG. 3e. Thus, during the retrace interval $t_3-t_6$, the voltage $v_{s1}$ equals a pulse 88 corresponding to the pulse 85 of the primary winding voltage $v_p$.

Flyback transformer regulator winding 34 is relatively loosely coupled with primary winding 32, with a coefficient of coupling between windings 32 and 34 of $k_2=0.78$. Because of the loose coupling between regulator winding 34 and primary winding 32, substantial leakage inductance exists. This leakage inductance is illustrated in FIG. 1 by the inductance 87 in series with winding 34. Because regulator winding 33 is relatively tightly coupled with primary winding 32, the predominant inductance in series with SCR 80 comprises the leakage inductance 87 associated with the loosely coupled regulator winding 34.

Regulator control circuit 77 turns on SCR 80 at a controllable instant within the trace interval of each deflection cycle, at time $t_1$ of FIGS. 3a-3e, for example. As illustrated in FIG. 3b, an input current $i_0$ begins to flow at time $t_1$ from the input voltage source terminal 26 through the series arrangement of regulator windings 33 and 34 and SCR 80 to the B+ supply terminal. Between times $t_1-t_3$, $t_3$ being the end of the trace interval, input current $i_0$ comprises an upwardly sloping ramp current 89, reaching a peak magnitude $I_p$ at time $t_3$.

Leakage inductance 87 comprises the series impedance which produces the ramp waveshape to the input current and which limits the flow of input current between terminal 26 and the B+ supply terminal. During the trace interval between times $t_0-t_3$, the voltage applied to one end of leakage inductance 87 comprises the unregulated DC input voltage $V_{in}$ in series with the trace voltage reflected into tightly coupled regulator winding 33 in series with the trace voltage reflected into the loosely coupled regulator winding 34. The voltage applied to the other end of leakage inductance 87, when SCR 80 is conducting, comprises the regulated B+ scanning voltage $V_0$. The voltage impressed across leakage inductance 87 is, therefore, the voltage $v_L=v_T+\Delta v$, where $v_T$ equals the sum of the reflected trace voltages across regulator windings 33 and 34 and where $\Delta v$ is the difference voltage, $\Delta v=V_{in}-V_0$. The slope of the input current $i_0$ is a positive or upwardly going slope $di_0/dt=v_L/L$, where L represents the effective inductance in series with SCR 80, which is predominantly the leakage inductance 87 associated with loosely coupled regulator winding 34.

To turn off the SCR each deflection cycle, the SCR is commutated off during the retrace interval by a decreasing input current 90, with the current reaching zero near time $t_4$. A snubber network 79 is coupled across SCR 80. Between times $t_3$–$t_4$, within the retrace interval $t_3$–$t_6$, the input current $i_0$ is a negative or downwardly sloping ramp. The reversal in slope polarity is due to the development of an opposite polarity retrace pulse voltage reflected to regulator windings 33 and 34. The interval $t_3$–$t_4$ represents the commutation time or interval during which the input current is decreasing, and is the time needed to turn off SCR 80 once retrace commences near time $t_3$. The negative slope of the input current during the SCR commutation interval is $-di_0/dt = (v_R - \Delta v)/L$, where $v_R$ equals the sum of the retrace pulse voltages reflected into regulator windings 33 and 34. The commutation time $T_c = LI_p/(v_R - \Delta v)$. Thus, the commutation time of the SCR increases with increasing peak input current $I_P$ flowing at the beginning of retrace, and with increasing series inductance L, and at high-line values of the input voltage $V_{in}$.

The average value, $I_{avg}$, of the input current $i_0$ represents the average load current flowing out of the B+ terminal and increases with increased beam current loading of ultor terminal U and with increased loading on the power supplies coupled to winding 35.

To maintain a regulated B+ scanning voltage $V_0$, the voltage at the B+ terminal is fed back to regulator control circuit 77 along a conductor line 93. Regulator control circuit 77 varies the turn-on instant within trace of SCR 80 as the B+ scanning voltage varies in order to regulate against these variations. The dashed waveform of the input current $i_0$ of FIG. 3b is obtained at the higher values of the unregulated DC input voltage $V_{in}$. SCR 80 is turned on at a later instant $t_2$ within trace. The difference voltage $\Delta v$ is greater at the higher input voltage levels. The slope of the positive ramp portion 91 of the input current $i_0$ is steeper than that of the ramp portion 89 obtained at lower input voltage line conditions.

If the power consumed by the television receiver remains substantially unchanged with input voltage variations, then the average value, $I_{avg}$, of the input current will vary inversely with these variations. Nevertheless, the peak value, $I_P'$, of the current, $i_0$, at the beginning of retrace at time $t_3$, will be greater at high line than the peak value, $I_P$, under low line because of the steeper slope to the ramp portion 91 than the ramp portion 89. Because the peak value of the input current is significantly greater for high line than for low line conditions and because the downwardly sloping input current may be slightly shallower at high line, the commutation time of the SCR is increased to the interval $t_3$–$t_5$, as illustrated by the downwardly sloping ramp portion 92 of the input current $i_0$ in FIG. 3b.

After SCR 80 is commutated off near time $t_5$, a commutated turn-off time $t_q$ must elapse before the forward blocking junction of the SCR establishes a forward-depletion region that enables SCR 80 to develop a forward blocking voltage. The forward blocking voltage of SCR 80 prevents forward anode current conduction at the beginning of the next trace interval, at time $t_6$, when the trace voltages reflected into regulator windings 33 and 34 apply a positive voltage to the anode of the SCR.

The design of SCR regulator 81 must ensure the proper commutation of the SCR under all normal operating conditions. That is to say, the sum of the commutation time $T_c$ and the turn-off time $t_q$ of the SCR should be sufficiently shorter than the retrace interval $T_R$ so as to enable the SCR to switch into the forward blocking state before forward voltage is reapplied to the anode of the SCR near the beginning of the next trace interval, near time $t_6$.

In the prior art circuitry, a single flyback transformer secondary winding, loosely coupled with the primary winding, is placed in series with the regulator SCR. The leakage inductance of the single secondary winding serves as the series impedance to limit the flow of input current during the trace interval when the SCR is conducting. Because of various design constraints on the flyback transformer construction, only a few methods of adjusting the leakage inductance are convenient to use, once the basic transformer design is fixed. One method involves adjusting the number of turns of the regulator secondary winding. To decrease leakage inductance, for example, the number of regulator secondary winding turns is reduced.

With only a single, flyback transformer regulator secondary winding being used, flexibility to increase the range of SCR regulator operation is lost once the basic flyback transformer design has been selected. For example, assume it is desired to increase the SCR regulator operating range to regulate at higher input voltages and high loading levels. At the higher input line and load levels, the peak input current at the beginning of retrace is greater. The commutation time of the SCR is increased.

To ensure that the commutation time of the SCR within retrace is sufficiently short to enable the SCR to attain a forward blocking stage before the beginning of the next trace interval, it is desirable to reduce the leakage inductance of the regulator secondary winding. With the basic transformer design relatively fixed, the leakage inductance may be reduced by decreasing the number of regulator secondary winding turns. However, since the commutation time of the SCR is also a function of the retrace pulse voltage amplitude reflected by the regulator secondary winding, reducing the number of secondary winding turns will also reduce the reflected retrace pulse voltage, thereby tending to lengthen the commutation time. The shortening of the commutation time due to the selection of a fewer number of turns to decrease the leakage inductance is substantially offset by this lengthening of the commutation time due to the reduction of the reflected retrace pulse voltage.

With only a single regulator secondary winding being used, the range of operating temperature of the SCR device may have to be restricted or greater heat sinking of the device may be required. The inherent turn-off time $t_q$ of the SCR that is needed to establish a forward blocking condition once the SCR is commutated off is substantially affected by the operating temperature of the SCR device. Higher operating tempertures increase the turn-off time $t_q$ of the device. Thus, to operate at higher ambient temperatures or with smaller heat sinking, the commutation time of the SCR must be reduced to accommodate the longer turn-off time $t_q$. As mentioned previously, decreasing the number of turns of the regulator secondary winding will not substantially reduce the SCR commutation time once the basic transformer design has been fixed.

A feature of the invention is to provide design freedom in adjusting the various operating ranges of the SCR regulator, once the basic flyback transformer configuration has been selected based upon other design criteria. Instead of using a single regulator secondary winding, two windings, windings 33 and 34 of FIG. 1, are used. Winding 33 is tightly coupled magnetically with primary winding 32, and winding 34 is loosely coupled magnetically with the primary winding. As an illustrative example, the coefficient of coupling $k_1$ of winding 33 may be 0.92, whereas the coefficient of coupling $k_2$ of the less tightly coupled winding 34 may be 0.78.

Because winding 33 is tightly coupled with primary winding 32, relatively little leakage inductance exists between the two windings, whereas a substantial leakage inductance exists between winding 34 and primary winding 32. Thus, the predominant component of the inductance in series with SCR 80 is that of the leakage inductance of winding 34.

Illustrated in FIG. 3d is voltage $v_{s2}$ developed across the stake terminals of loosely coupled secondary winding 34. During the intervals within each horizontal deflection cycle that SCR 80 is cut off, between times $t_0-t_1$ and $t_4-t_6$, the voltage $v_{s2}$ across loosely coupled secondary winding 34 generally follows the waveshape of the primary winding voltage $v_p$. During the portion of retrace between times $t_4-t_6$, the voltage $v_{s2}$ is a pulse waveform, and during the portion of trace between times $t_0-t_1$, the voltage $v_{s2}$ equals the waveform 94.

Illustrated in FIG. 3c is the voltage $v_s$ between terminal 26 and the anode of SCR 80. The voltage $v_s$ equals the sum of the voltages developed across windings 33 and 34. Thus, $v_s = v_{s1} + v_{s2}$. During the conduction time of SCR 80, between times $t_1-t_4$, the voltage $v_s$ comprises the voltage portion 95 and equals in magnitude the difference voltage $\Delta v = V_{in} - V_0$, a relatively constant magnitude voltage. Because the voltage $v_{s1}$ across tightly coupled secondary winding 33 is constrained to follow the waveshape of the primary winding voltage $v_p$ even during the conduction interval $t_1-t_4$ of SCR 80, the voltage $v_{s2}$ must depart from the primary winding voltage waveshape in order that the sum of the two winding voltages equals the constant voltage portion 95 of the voltage $v_s$.

As illustrated in FIG. 3d, when SCR 80 conducts during the trace interval between times $t_1-t_3$, the voltage $v_{s2}$ across loosely coupled winding 34 is the voltage portion 96. Portion 96 is reversed in polarity from the polarity of the trace portion 94 existing prior to time $t_1$. When SCR 80 conducts during the retrace interval between times $t_3-t_4$, the voltage $v_{s2}$ again reverses polarity to become the positive voltage portion 97. Thus, between times $t_1-t_4$ the voltage $v_{s2}$ does not follow the primary winding voltage waveshape. The leakage inductance of winding 34 develops the necessary voltage to enable the voltage $v_{s2}$ between times $t_1-t_4$ to equal the difference between the contstant voltage $v_s$ and the deflection waveform voltage $v_{s1}$ between times $t_1-t_4$.

After time $t_4$, when SCR 80 is commutated off and the voltage $v_s$ is no longer clamped at a voltage magnitude $\Delta v$, the voltage $v_{s2}$ can resume following the general waveshape of the primary winding voltage, as illustrated in FIG. 3d by the pulse 98 during retrace between times $t_4-t_6$ and by the trace voltage portion 94 between times $t_0-t_1$.

To produce the downwardly sloping ramp portion 90 or 92 of the input current $i_0$ in FIG. 3b, the retrace pulse voltages reflected into regulator windings 33 and 34 are applied in series to the leakage inductance of winding 34. The total reflected retrace pulse voltage is determined by the total number of turns in the series arrangement of windings 33 and 34. Thus, the amplitude of the total reflected retrace pulse voltage is a function of the total number of turns $n_t = n_1 + n_2$, where $n_1$ equals the number of turns of the tightly coupled winding 33 and $n_2$ is the number of turns of the loosely coupled winding 34.

To increase the range of operation of switching regulator 81 to higher input line voltages, higher input current levels and high operating temperatures of the SCR device, the leakage inductance of the loosely coupled regulator secondary winding 34 is reduced by decreasing the number of its turns relative to the number of turns of the tightly coupled winding 33, while at the same time maintaining the total number of turns $n_t$ constant. Winding turns are removed from the loosely coupled secondary winding 34, and the same number of turns are added to the tightly coupled winding 33. Removing turns from winding 34 reduces its leakage inductance, thereby reducing the inductance in series with SCR 80, as is required to increase operating range. Adding the same number of turns to the tightly coupled secondary winding 33 maintains the total number of turns $n_t$ unchanged and thus maintains the total deflected retrace pulse voltage also relativey unchanged. Furthermore, because of the tight coupling, adding turns to winding 33 does not substantially increase the leakage inductance in series with SCR 80.

Figure 2:
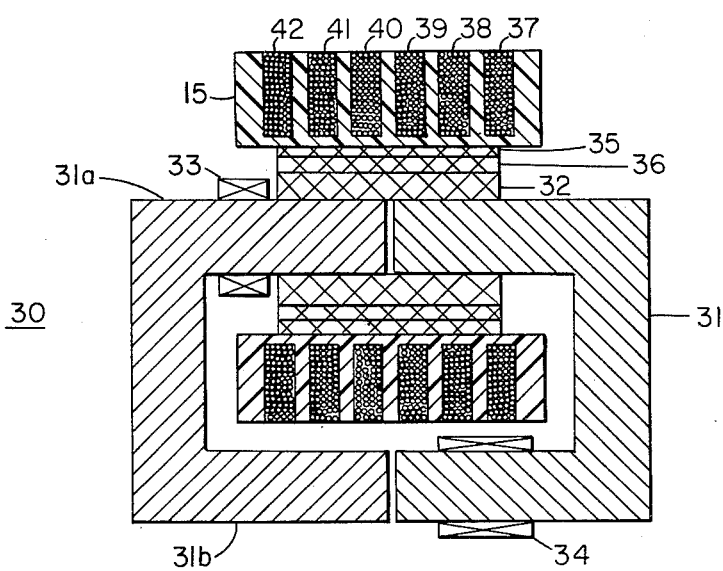
FIG. 2 illustrates a specific embodiment of a flyback transformer construction in accordance with the invention.

FIG. 2 illustrates a specific embodiment of the construction of the flyback transformer 30 of FIG. 1, in accordance with the invention. The core 31 of flyback transformer 30 comprises two C-core members butted together to form a generally rectangular core. Wound concentrically around a leg 31a of rectangular core 31 are primary winding 32, secondary winding 36, secondary winding 35 and high voltage windings 37–42. Each of high voltage windings 37–42 is wound in an associated slot formed in a plastic retaining bobbin 15.

To provide tight coupling between regulator secondary winding 33 and primary winding 32, regulator secondary winding 33 is wound around the same leg 31a that primary winding 32 is wound around. In FIG. 2, tightly coupled regulator secondary winding 33 is illustrated as being wound adjacent to primary winding 32 on the same leg 31a. Alternatively, regulator secondary winding 33 may be wound concentrically with primary winding 32, either over or under the primary winding. To provide the required loose coupling between regulator secondary winding 34 and primary winding 32, the regulator secondary winding 34 is wound around the opposite leg 31b of core 31.

Because loosely coupled secondary winding 34 is wound around the opposite leg from that of primary winding 32, a significant leakage flux path exists so that a substantial amount of the flux that links one of the windings 32 and 34 does not link the other winding. In addition to adjusting the number of turns of the loosely coupled regulator winding 34, the leakage inductance of winding 34 may be further controlled by the placement of regulator winding 34 at different locations on the opposite core leg 31b.

By providing two regulator secondary windings, one relatively loosely coupled with the primary winding and one relatively tightly coupled with the primary winding, design flexibility is enhanced in adjusting the amount of leakage inductance available without deleteriously affecting the total reflected retrace pulse amplitude applied to the SCR during retrace.

What is claimed is:

1. A regulated deflection circuit, comprising:
   a deflection winding;
   a deflection generator coupled to said deflection winding for generating scanning current in said deflection winding during each deflection cycle, said deflection generator developing a retrace pulse voltage across said deflection winding during a retrace interval of each deflection cycle;
   a source of input voltage;
   a controllable switch;
   a flyback transformer including a first winding having said deflection winding retrace pulse voltage applied thereto for developing retrace pulse voltages across other flyback transformer windings, said flyback transformer including second and third windings coupled in a series arrangement with said controllable switch across said source of input voltage, the magnetic coupling of said third winding with said first winding being less than that of said second winding with said first winding;
   control means coupled to said controllable switch for turning on said controllable switch at a controllable instant within a trace interval of each deflection cycle, wherein input current from said source flows during each deflection cycle in said series arrangement beginning at said controllable instant, and wherein said deflection winding retrace pulse voltage when applied to said flyback transformer first winding produces a decreasing magnitude input current for commutating off said controllable switch within the retrace interval of each deflection cycle; and
   means for applying to said control means a signal representative of a deflection circuit energy level for varying said controllable instant to provide regulation of said energy level.

2. A circuit according to claim 1 wherein said flyback transformer includes a generally rectangular core with said first and second flyback transformer windings being located on one leg of said core and said third flyback transformer winding being located on another leg.

3. A circuit according to claims 1 or 2 wherein said series arrangement exhibits an inductance, the greater portion of which inductance comprises the leakage inductance existing between said first and third flyback transformer windings.

4. A circuit according to claim 3 including means for developing a direct current voltage at an output terminal of said controllable switch, said flyback transformer first winding being conductively coupled to said output terminal.

5. A circuit according to claim 4 wherein said deflection circuit energy level representative signal comprises a signal representative of the level of said direct current voltage.

6. A circuit according to claim 5 wherein said controllable switch comprises a silicon controlled rectifier.

7. A circuit according to claim 6 including a high voltage circuit coupled to a fourth winding of said flyback transformer for developing an ultor voltage from the voltage developed across said fourth winding.

* * * * *